(12) United States Patent
Lahrman et al.

(10) Patent No.: US 7,997,185 B2
(45) Date of Patent: Aug. 16, 2011

(54) PISTON RING

(75) Inventors: John C. Lahrman, Muskegon, MI (US); Steven J. Sytsma, Muskegon, MI (US)

(73) Assignee: Mahle Engine Components USA, Inc., Muskegon, MI (US)

( * ) Notice: Subject to any disclaimer, the term of this patent is extended or adjusted under 35 U.S.C. 154(b) by 673 days.

(21) Appl. No.: 12/054,101

(22) Filed: Mar. 24, 2008

(65) Prior Publication Data

US 2008/0229922 A1 Sep. 25, 2008

Related U.S. Application Data

(60) Provisional application No. 60/919,738, filed on Mar. 23, 2007.

(51) Int. Cl.
*F16J 9/08* (2006.01)

(52) U.S. Cl. .......... 92/201; 277/451; 277/456; 277/457

(58) Field of Classification Search .................. 92/201; 277/451, 456, 457
See application file for complete search history.

(56) References Cited

U.S. PATENT DOCUMENTS

| | | |
|---|---|---|
| 1,699,135 A | 1/1929 | Cronin |
| 1,749,832 A | 3/1930 | Morton |
| 2,052,077 A | 8/1936 | Bristow |
| 2,228,495 A | 1/1941 | Williams |
| 2,631,907 A | 3/1953 | Johnson, Jr. |
| 2,634,179 A * | 4/1953 | Haverly ................. 277/451 |
| 2,670,259 A | 2/1954 | Bergeron |
| 2,967,745 A | 1/1961 | Stevens |
| 3,656,770 A * | 4/1972 | Hoffmann ............... 277/451 |
| 4,592,559 A | 6/1986 | Harvey |
| 4,669,369 A | 6/1987 | Holt et al. |
| 5,001,965 A | 3/1991 | Ruddy et al. |
| 5,039,116 A * | 8/1991 | Maeda .................. 277/444 |
| 5,253,877 A | 10/1993 | DeBiasse et al. |
| 5,474,307 A | 12/1995 | DeBiasse et al. |
| 5,634,179 A | 5/1997 | Umeda et al. |
| 6,705,616 B2 | 3/2004 | Fujii et al. |
| 7,188,841 B1 | 3/2007 | Sytsma et al. |
| 2001/0048199 A1 | 12/2001 | Evans |
| 2003/0006562 A1 | 1/2003 | Feistel |
| 2003/0015163 A1 | 1/2003 | Fujii et al. |
| 2005/0051970 A1 | 3/2005 | Edelmann |

FOREIGN PATENT DOCUMENTS

| | | |
|---|---|---|
| CN | 1515792 A | 7/2004 |
| EP | 1431631 | 10/2003 |
| GB | 2 117 868 A | 10/1983 |
| JP | 60-109688 | 6/1985 |
| JP | 11201283 | 7/1999 |
| JP | 2003294141 | 10/2003 |

* cited by examiner

*Primary Examiner* — F. Daniel Lopez

(74) *Attorney, Agent, or Firm* — Rader, Fishman & Grauer PLLC

(57) ABSTRACT

A piston has a body with a first circumferentially disposed groove. A first ring is movably disposed within the first groove. The first ring defines an inner circumferential groove. A blocking ring is at least partially located in the groove of the first ring and the groove of the piston. One or more vent passages may connect a first volume in the piston to a second volume outside the piston.

17 Claims, 3 Drawing Sheets

PISTON RING

CROSS REFERENCE TO RELATED APPLICATIONS

This application claims priority to U.S. Provisional Patent Application 60/919,738, filed Mar. 23, 2007, which is incorporated by reference in its entirety.

TECHNICAL FIELD

The present disclosure relates to a piston for an internal combustion engine, and lubrication systems for pistons.

BACKGROUND

Internal combustion engines, including diesel engines, subject piston top ring seals to high pressures and temperatures that cause wear on the seals and on the cylinder walls of the engine. Piston ring seals are generally seated in a groove formed in the outer circumference of the piston and perform at least two functions to ensure efficient operation of the engine. First, during the power cycle, the ring seals prevent gases under high pressure from bypassing the piston. Thus, maximum driving force is applied to the piston. Second, on the return stroke, the ring seals prevent lubricants from entering the combustion chamber. If the ring seals fail to perform efficiently, the engine will not develop the maximum power due to "blow-by" on the power cycle. Additionally, if the ring seals leak during the return stroke, lubricants will enter the combustion chamber, thereby reducing combustion efficiency and increasing air pollution by way of the exhaust cycle. Generally, the ring seal provides the interface between the piston and the cylinder wall. Thus, reduced friction is desired. Conventional top ring seals experience radial excursion during high-pressure periods in the combustion cycle. More particularly, the high-pressure gases leak behind the ring seal and force an outwardly radial excursion of the ring seal against the cylinder wall. The result is reduced efficiency of the lubricating film, and thus the film does not fully protect the ring seal and the cylinder wall from direct frictional contact. The result is excessive wear of both the ring seal and the cylinder wall.

Because of this, there is a need for a piston seal that produces lesser radial forces between the ring seal and the cylinder wall during maximum chamber pressures. Use of such a piston seal results in improved sealing, reduced wear and it provides an efficient lubricant action throughout the piston stroke.

BRIEF DESCRIPTION OF THE DRAWINGS

While the claims are not limited to the illustrated examples, an appreciation of various aspects is best gained through a discussion of various examples thereof. Referring now to the drawings, illustrative examples are shown in detail. Although the drawings represent the various examples, the drawings are not necessarily to scale and certain features may be exaggerated to better illustrate and explain an innovative aspect of an example. Further, the examples described herein are not intended to be exhaustive or otherwise limiting or restricting to the precise form and configuration shown in the drawings and disclosed in the following detailed description. Exemplary illustrations of the present invention are described in detail by referring to the drawings as follows.

DETAILED DESCRIPTION

Figure 1:
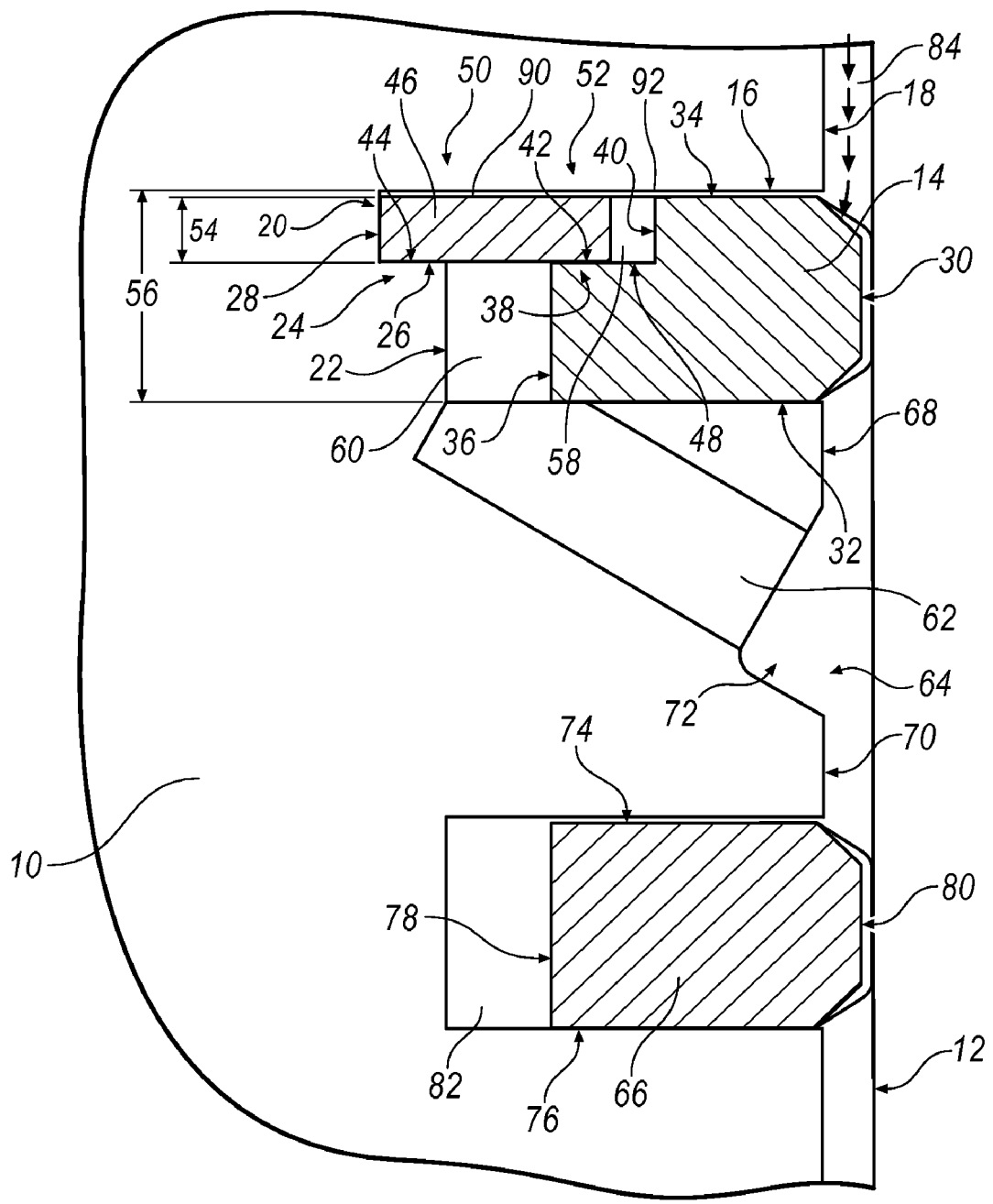
FIG. 1 is a fragmentary, sectional view of an exemplary piston assembly.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present invention. Further, the descriptions set forth herein are not intended to be exhaustive or otherwise limit or restrict the claims to the precise forms and configurations shown in the drawings and disclosed in the following detailed description.

Moreover, there are a number of constants introduced in the discussion that follows. In some cases illustrative values of the constants are provided. In other cases, no specific values are given. The values of the constants will depend on characteristics of the associated hardware and the interrelationship of such characteristics with one another as well as environmental conditions and the operational conditions associated with the disclosed system.

According to various exemplary illustrations, a piston is disclosed that may have a piston body, a first ring, a blocking ring, a first volume and a plurality of vent passages. The piston body may have a first circumferentially disposed groove that includes an upper circumferential groove and a lower circumferential groove. The first ring may be movably disposed within the first groove. A circumferential groove may be defined in the first ring. The blocking ring may have a generally annular body and an inner end portion and an outer end portion. The inner end portion may be disposed in the upper circumferential groove and the outer end portion may be disposed in the groove of the first ring. The first volume may be defined by the blocking ring, the first ring and the lower groove. The plurality of vent passages may connect the first volume to a second volume bounded by the first ring, a cylinder bore and a second ring seal. The vent passages may extend through the piston body Turning now to FIG. 1, an exemplary piston assembly is illustrated, including a piston or piston body 10 located within a cylinder bore 12. The piston 10 reciprocates within the cylinder bore 12. A first ring 14, such as a piston ring seal, surrounds the piston 10 and is at least partially seated in a first outer circumferential groove 16 formed in an outer circumference 18 of the piston 10.

The first groove 16 in the piston 10 for the first ring 14 may include an upper circumferential groove 20 and a lower circumferential groove 22. The upper groove 20 may define a first seat 24. A lower surface 26 of the upper groove 20 and an innermost wall 28 of the upper groove 20 may at least partially comprise the first seat 24.

Preferably, the upper groove 20 is above the lower groove 22 in the first groove 16. The upper groove 20 may also depend radially inward further into the piston 10 than the lower groove 22 depends radially inward into the piston 10. The first ring 14 may be movably disposed in the radial direction within the first groove 16.

The first ring 14 has an outer surface 30, a lower surface 32, an upper surface 34 and an inner surface 36. The outer surface 30 may be single or multi-faceted, as illustrated in FIG. 1. Preferably, the outer surface 30 contacts, is in selective contact with, or is directly adjacent the cylinder bore 12. Lubricants may be provided in a conventional manner (not shown), thereby preventing excessive frictional contact between the first ring 14 and the cylinder bore 12.

The first ring 14 may be a nitrided stainless, chrome plated or physical vapor deposition coated ring. Regardless of its construction, the ring substantially prevents pressure "blow-by" of combustion materials and substantially prevents contamination of the combustion chamber by lubricants (not shown) of the internal combustion engine.

The inner surface 36 and the upper surface 34 of the first ring 14 may define a second seat 38. The second seat 38 may comprise an upright wall 40. The upright wall 40 of the second seat 38 and the innermost wall 28 of the upper groove 20 may be parallel with one another, as discussed further below. Alternatively, the walls 28, 40 may be non-parallel with one another.

The second seat 38 may also be comprised of a substantially horizontal wall 42. Similarly, the lower surface 26 of the upper groove 20, or first seat 24, may be a substantially horizontal wall 44. The horizontal walls 42, 44 of the first seat 24 and the second seat 38 may be axially aligned with one another. The substantially horizontal wall of the second seat 38 may be parallel with the upper surface 34 and the lower surface 32 of the first ring 14. It can be appreciated that walls 40, 42 form a groove 48 in the first ring 14.

A blocking ring 46 having a generally annular body may be located at least partially within the upper groove 20 and at least partially within the groove 48 on the first ring 14. Preferably, an inner end portion 50 of the blocking ring 46 may engage the first seat 24 and an outer end portion 52 of the blocking ring 46 may engage the second seat 38, such that the blocking ring 46 is generally received by the first and second seats 24, 38.

Preferably, the blocking ring 46 has an axial dimension 54 that is smaller than an axial dimension 56 of the first ring 14. By way of example only, and as further discussed below, the blocking ring 46 may have an axial dimension 54 that is approximately one half to approximately one third of the axial dimension 56 of the first ring 14.

Figure 2:
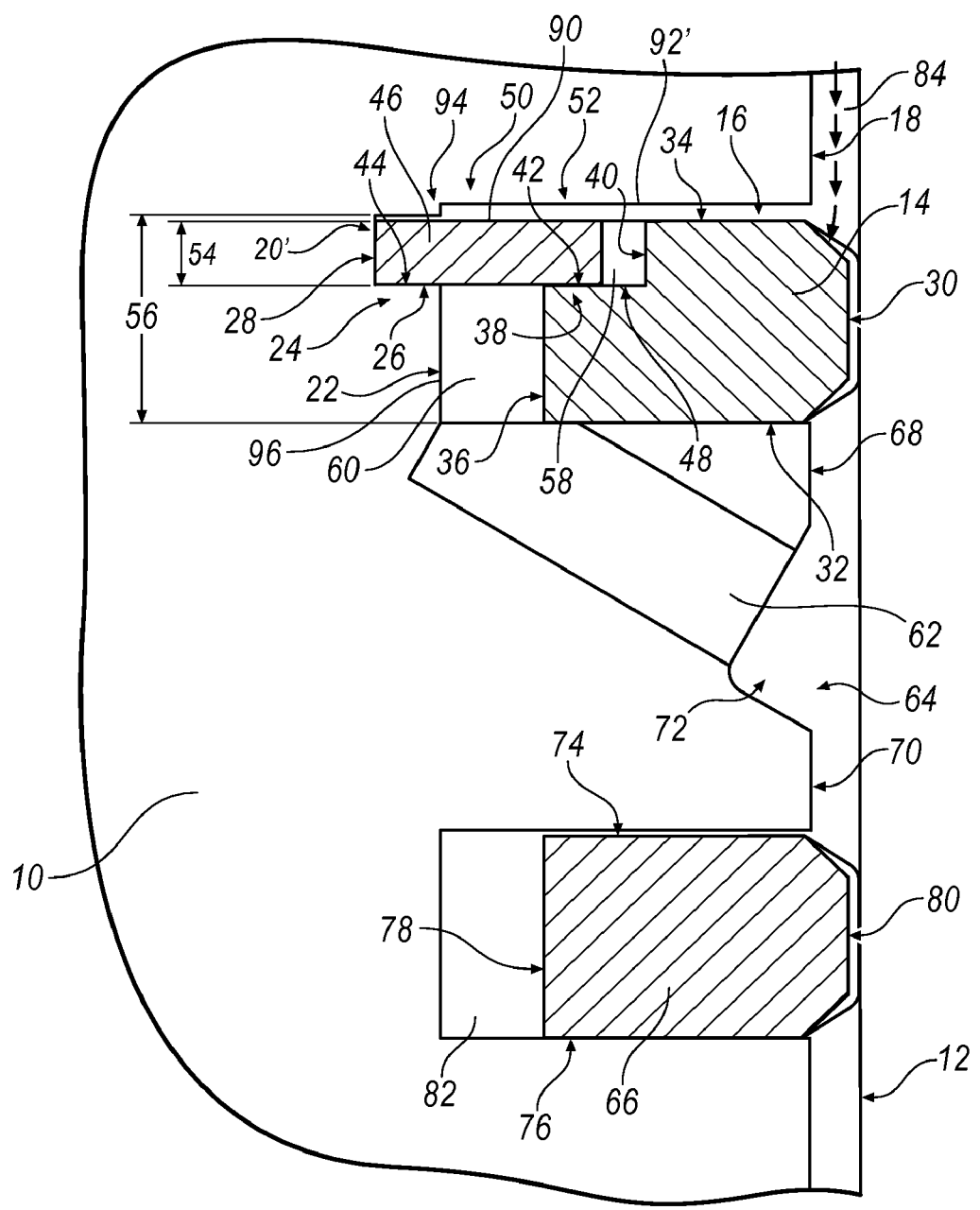
FIG. 2 is a fragmentary, sectional view of another exemplary piston assembly.

As shown in FIG. 1, an upper surface 92 of upper groove 20 may be generally continuous, such that it generally defines a consistent distance or spacing with upper surface 90 of blocking ring 46 along the radial extent of the upper surface 90 of blocking ring 46. Alternatively, as shown in FIG. 2 and further described below, an upper surface 92' of upper groove 20' may include a discontinuity 94 which serves to space the upper surface 90 of blocking ring 46 away from at least a portion of the upper surface 92' of upper groove 20'. For example, discontinuity 94 may be formed by a machining operation, e.g., by removing material from a portion of upper surface 92 of upper groove 20, by removing material from a radially inward wall of the first groove 16 and/or upper groove 20, etc.

A clearance area 58 may exist between the outer end portion 52 of the blocking ring 46 and the wall 40 of the first ring 14. Based on the location of the clearance area 58, it can be appreciated the first ring 14 may move in the radial direction. More particularly, the first ring 14 may move into and out of the upper groove 20 as the piston 10 moves slightly from side to side in the cylinder bore 12 during its operation.

A first volume 60 may be defined by the blocking ring 46, the lower groove 22 and the first ring 14. The first volume 60 depicted in FIG. 1 is merely for exemplary purposes only. The first volume 60 may comprise any size or shape and it is not limited to that which is depicted in the drawings. It can be appreciated from the drawings that the first volume 60 permits radial movement of the first ring 14.

Figure 3:
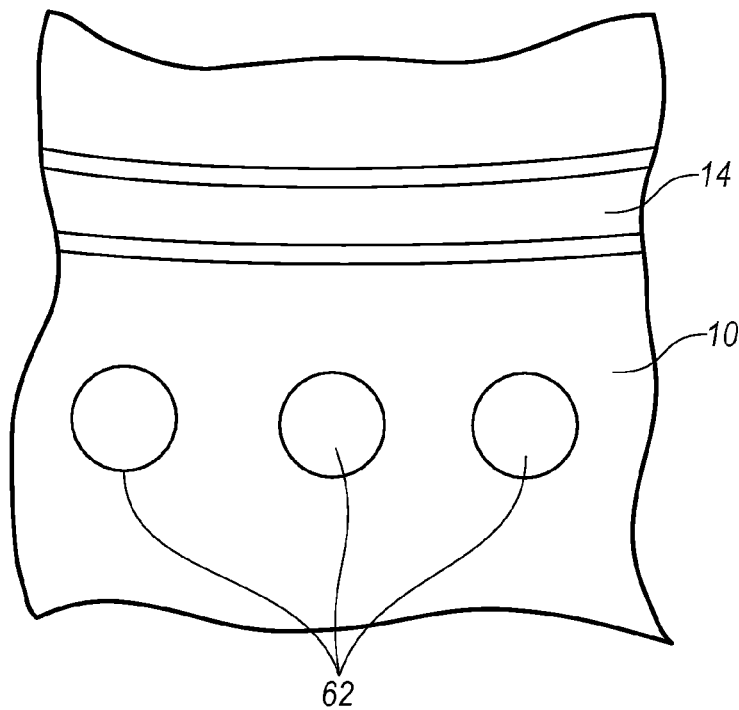
FIG. 3 is a fragmentary view of the piston assembly of FIG. 1.

At least one vent passage 62 may extend from the first volume 60, through the body of the piston 10 to a second volume 64. Further, as best shown in FIG. 3, a plurality of vent passages 62 may be provided about a perimeter of the piston body 10. The second volume 64 may be disposed generally outside the piston 10, i.e., between the piston 10 and the cylinder bore 12. For example, the second volume 64 may be bounded by the first ring 14, the cylinder bore 12, and a second ring 66. The vent passages 62 may extend substantially at a single angle, as depicted in FIG. 1, from the first volume 60 to the second volume 64. Preferably, the vent passages 62 open into the second volume 64 below the first ring 14 and a first piston land 68 but above a second piston land 70 and the second ring 66. (Note: A "first" piston land, "second" piston land, etc., merely refers to an order in which the various piston lands are identified, and is not necessarily an indication of a position of the respective piston lands on the piston 10.) Accordingly, the vent passages 62 may each include a first end disposed adjacent the first volume 60 and a second end disposed adjacent the second volume 64, where the second end of the vent passages 62 are spaced away from the first ring 14 by the first piston land 68. A depression 72, or an annular groove, may be located in the piston 10 where the vent passages 62 open into the second volume 64, thereby generally increasing the overall volume of the second volume 64.

The second ring 66 is generally annular and includes an upper surface 74, a lower surface 76, an inner surface 78 and an outer surface 80. The outer surface 80 may be single or multi-faceted. Preferably, the outer surface 80 contacts, is in selective contact with, or is directly adjacent the cylinder bore 12. The ring 66 substantially prevents pressure "blow-by" of combustion materials and substantially prevents contamination of the combustion chamber by lubricants (not shown) of the internal combustion engine.

The upper surface 74 and the lower surface 76 of the second ring 66 may be substantially parallel with one another. The second ring 66 is preferably movably located in a second circumferential groove 82 about the piston 10 that is located below the first circumferential groove 16.

During operation of the piston 10 within the cylinder bore 12 and in particular during the combustion cycle, high pressures may be generated. For example, combustion material under combustion pressures follow a leak path 84 formed by the cylinder bore 12, the first ring 14 and the piston 10, as shown by the arrows. The blocking ring 46 generally prevents any high pressure gases or combustion materials, such as any that may escape between the blocking ring 46 and the first ring 14 into the first volume 60, from excessively bearing on the inner surface 36 of the first ring 14. Provision of the blocking ring 46 thus effectively proportionally reduces the total force exerted by the outer surface 30 of the first ring 14 against the cylinder bore 12. High pressure gases and/or combustion material leaking past the blocking ring 46 may be vented below the first ring 14 via the passages 62.

More specifically, the blocking ring 46 occupies a percentage of the area of the inner surfaces 36, 40 of the first ring 14. Thus, the blocking ring 46 blocks an area on the first ring 14 that might otherwise be exposed to high pressure gases and/or combustion material. It can be appreciated by reducing surface area on the first ring 14 upon which combustion material can act, the effect of that material, e.g., a tendency to force first ring 14 radially outwards against cylinder bore 12, on the first ring 14 is greatly reduced. In other words, the exposure of the inner surface 36 of the first ring 14 to the combustion material is regulated by the ratio of the axial dimension 54 of the blocking ring 46 to the axial of the dimension 56 first ring 14. Accordingly, an overall influence of high pressure gases and/or combustion materials upon first ring 14 may be adjusted upwards and downwards by decreasing and increasing, respectively, the ratio of the blocking ring axial extension 54 to the first ring axial extension 56.

Furthermore, where walls 28, 40 are parallel, first ring 14 and blocking ring 46 may further reduce an amount of high pressure gases and/or combustion materials that may leak between the first ring 14 and blocking ring 46. In other words, parallel walls 28, 40 generally increase the extent to which blocking ring 46 and first ring 14 prevent high pressure gases and/or combustion materials escape into first volume 60, as the parallel walls 28, 40 will more effectively mate together and provide a sealing effect between the blocking ring 46 and the first ring 14, at least when the blocking ring 46 and the first ring 14 are generally pushed together (i.e., clearance area 58 is minimized). An overall influence of the high pressure gases and/or combustion materials on first ring 14 may thus be decreased by providing walls 28, 40 that are generally parallel to one another. Similarly, an overall influence of the high pressure gases and/or combustion materials on first ring 14 may be increased by providing walls 28, 40 that are generally non-parallel to one another, such that high-pressure gases and/or combustion materials are allowed to escape into first volume 60 to a greater extent than where walls 28, 40 are parallel.

The provision of first and second volumes 60, 64 additionally provides a measure of adjusting an influence of high-pressure gases and/or combustion materials on first ring 14 during operation of piston 10. As shown in FIGS. 1 and 2, first volume 60 is smaller than second volume 64, thereby increasing the degree to which pressure acting upon inner surface 36 of first ring 14 is alleviated during operation. The degree to which first ring 14 is radially urged outward by combustion gases and/or materials may be increased or decreased by increasing and decreasing, respectively, the ratio of the first volume 60 to the second volume 64.

Further, discontinuity 94 provided in upper surface 92' of upper groove 20' may increase an extent to which blocking ring 46 is urged downward against the first and second seats by high pressure gases and/or combustion materials. In other words, by spacing the upper surface 90 of blocking ring 46 away from at least a portion of the upper surface 92' of upper groove 20' allows high-pressure gases and/or combustion materials greater access to upper surface 90 of blocking ring 46, increasing a force with which blocking ring 46 is urged axially downward. Accordingly, provision of a discontinuity in upper surface 92' may generally decrease the extent to which first ring 14 may be urged radially outward during operation by decreasing an amount of high pressure gases and/or combustion materials that escape into the first volume 60. Further, a radial position of the discontinuity affects the degree to which high pressure gases and/or combustion materials act upon blocking ring 46. For example, as shown in FIG. 2, discontinuity is generally aligned with a radially inner wall of lower groove 22. If discontinuity 94 is spaced radially inward from where shown, i.e., away from cylinder bore 12, combustion materials and/or high pressure gases will have even greater access to upper surface 90 of blocking ring 46, thereby further increasing the sealing effect of blocking ring 46 against first ring 14. Alternatively, if discontinuity 94 is spaced radially outward, i.e., toward cylinder bore 12, or even removed entirely, the sealing effect of blocking ring 46 against first ring 14 may be decreased.

Figure 4:
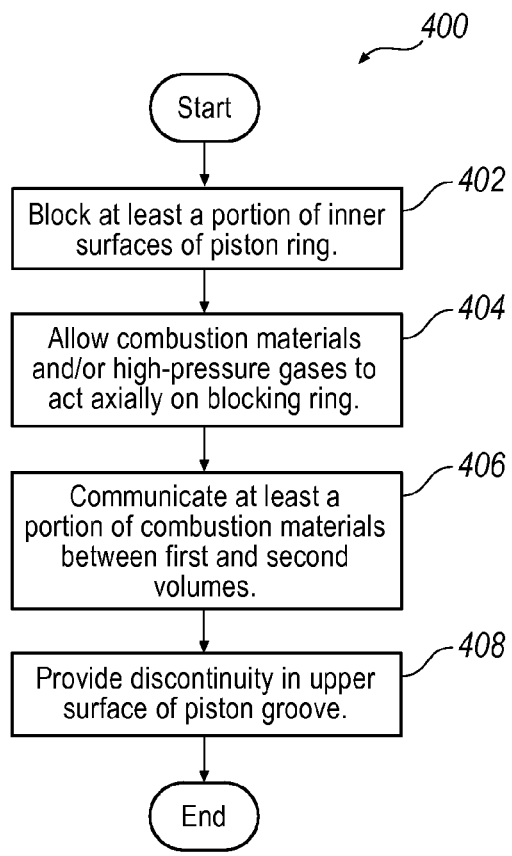
FIG. 4 is an exemplary process flow diagram.

Turning now to FIG. 4, a process 400 for reducing a force of combustion material on a piston ring is provided. Process 400 begins with step 402, where at least a portion of a surface area of an inner surface of a piston ring disposed in a piston groove is blocked with a blocking ring. For example, as described above, blocking ring 46 may limit the extent to which high pressure gases and/or combustion materials may communicate with inner surface 36 of first ring 14. Process 400 may then proceed to step 404.

In step 404, the combustion materials are allowed to act axially on the blocking ring. For example, as described above, combustion materials may act upon an upper surface 90 of the blocking ring 46, thereby generally urging blocking ring 46 axially downward and increasing the degree to which blocking ring 46 prevents combustion materials and/or high pressure gases from reaching first volume 60. Process 400 may then proceed to step 406.

In step 406, high-pressure gases and/or combustion materials that reach first volume are communicated between the first volume and a second volume. For example, as described above, high-pressure gases and/or combustion materials may reach the first volume 60 that is defined at least in part by inner surface 36 of first ring 14 and the first groove 16. The high-pressure gases and/or combustion materials may be communicated from the first volume 60 to the second volume 64 that is defined at least in part by the first ring 14, cylinder bore 12, and the second ring 66. Further, the second volume is preferably greater than said first volume, thereby reducing a pressure of the gases and/or combustion materials when the combustion materials are communicated from the first volume to the second volume. Further, as described above, the portion of combustion materials and/or gases that are communicated from the first volume 60 to the second volume 64 may be communicated through one or more vent passages 62 defined by the piston body 10. Additionally, the vent passages 62 may be located below the first ring 14 and a first land 68 of the piston 10. The first land 68 may be located below the first ring 14. Process 400 may then proceed to step 408.

In step 408, which is optional, a discontinuity is provided in an upper surface of the piston groove, thereby spacing the blocking ring away from the upper surface of the piston groove. For example, as described above, a discontinuity 94 may be provided in upper surface 92' of the upper groove 20', such that the degree to which combustion materials and/or high pressure gases act upon the upper surface 90 of the blocking ring 46.

Accordingly, piston 10 and process 400 provide a variety of parameters that may be adjusted to optimize an overall influence of combustion materials and/or gases upon a piston ring, e.g., first ring 14. For example, a radial extent of blocking ring 46 in comparison with first ring 14 may be adjusted upward or downwards to decrease or increase, respectively, the amount of surface area of first ring 14 acted upon that urges first ring 14 radially outwards against cylinder bore 12. Additionally, a discontinuity 94 may be provided in upper surface 92' of upper groove 20' and located at a predetermined position radially within the first groove 16, thereby adjusting the extent to which combustion materials and/or gases urge blocking ring 46 downward against first ring 14. Further, a ratio of the first volume 60 to the second volume 64 may be adjusted to optimize the extent to which pressure in the first volume 60 is reduced. Finally, provision of generally parallel or generally non-parallel walls 28, 40 may dictate in part the degree to which combustion gases and/or materials may escape into the first volume 60 during operation.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A piston, comprising:
  a piston body having an outer circumferentially disposed groove, a surface of said piston groove providing a first seat;
  a first ring selectively disposed within said piston groove and including a surface providing a second seat;
  a blocking ring with a generally annular body, an inner end portion, and an outer end portion, said inner end portion of said blocking ring selectively engaging said first seat, said outer end portion of said blocking ring selectively engaging said second seat, said blocking ring being selectively subjected to an axial force to controllably limit outward radial excursion of said first ring; and
  at least one vent passage formed in said piston body, said vent passage leading from a first volume to a second volume, said first volume bounded at least by an inner surface of said first ring and said piston groove, said second volume bounded by said first ring, a cylinder bore and a second ring;
  wherein an upper surface of said outer groove includes a discontinuity, thereby spacing an upper surface of said blocking ring away from at least a portion of said upper surface of said upper groove.

2. The piston of claim 1, wherein said outer groove includes an upper groove and a lower groove, and said first seat is defined at least in part by said upper groove.

3. The piston of claim 1, wherein said second seat comprises a groove on an upper, inner portion of said first ring.

4. The piston of claim 1, wherein a clearance area is selectively defined between said blocking ring and said groove of said first ring.

5. The piston of claim 1, wherein said blocking ring defines an axial dimension that is less than half of an axial dimension of said first ring.

6. The piston of claim 1, wherein said at least one vent passage includes a plurality of vent passages disposed about a perimeter of said piston body.

7. The piston of claim 1, wherein said at least one vent passage extends from a first end to a second end, said first end of said at least one vent passage adjacent said first volume, said second end adjacent said second volume, said second end spaced apart from said first ring by a first land of said piston body.

8. A piston, comprising:
  a piston body having a first circumferentially disposed groove, said first groove comprising an upper circumferential groove and a lower circumferential groove;
  a first ring movably disposed within said first groove, said first ring defining a circumferential groove;
  a blocking ring with a generally annular body, an inner end portion, and an outer end portion, said blocking ring disposed in said upper circumferential groove and said first ring circumferential groove;
  wherein said blocking ring, said first ring, and said lower groove cooperate to define a first volume;
  wherein said piston body, said first ring, a cylinder bore, and a second ring cooperate to define a second volume; and
  wherein said piston body defines at least one vent passage allowing fluid communication between said first volume and said second volume;
  wherein said at least one vent passage is located below said first ring and a first land on said piston, said first land disposed below said first ring.

9. The piston of claim 8, wherein said blocking ring is selectively subjected to an axial force to controllably limit the amount of outward radial excursion of said first ring.

10. The piston of claim 8, wherein a clearance area is selectively defined between said blocking ring and said circumferential groove on said first ring.

11. The piston of claim 8, wherein said circumferential groove on said first ring is axially aligned with said upper groove.

12. The piston of claim 8, wherein said at least one vent passage opens into a depression in said piston.

13. The piston of claim 8, wherein an innermost wall of said upper circumferential groove is substantially parallel to a wall of said circumferential groove of said first ring.

14. The piston of claim 8, wherein an upper surface of said upper groove includes a discontinuity, thereby spacing an upper surface of said blocking ring away from at least a portion of said upper surface of said upper groove.

15. The piston of claim 8, wherein said at least one vent passage includes a plurality of vent passages disposed about a perimeter of said piston body.

16. A method of reducing the force of combustion material on a piston ring, comprising:
  blocking at least a portion of a surface area of an inner surface of a piston ring disposed in a piston groove with a blocking ring, said inner surface of said piston ring in communication with combustion materials;
  allowing said combustion materials to act axially on said blocking ring; and
  communicating a portion of said combustion materials between a first volume and a second volume, said first volume defined at least in part by an inner surface of said piston ring and said piston groove, said second volume disposed outside said piston, said second volume defined at least in part by said piston ring, a cylinder bore, and a second ring, said second volume being greater than said first volume, thereby reducing a pressure of the combustion materials when said combustion materials are communicated from said first volume to said second volume;

wherein said portion of said combustion materials is communicated through a vent passage defined by said piston, said vent passage located below said piston ring and a first land on said piston, said first land disposed below said first ring.

17. The method of claim 16, further comprising providing a discontinuity in an upper surface of said piston groove, thereby spacing said blocking ring away from at least a portion of said upper surface of said piston groove.

* * * * *